United States Patent [19]

Abe

[11] Patent Number: 4,933,225
[45] Date of Patent: Jun. 12, 1990

[54] PRESSED CEILING FOR USE IN VEHICLES

[75] Inventor: Nobuo Abe, Ayase, Japan

[73] Assignee: Ikeda Bussan Co., Ltd., Ayase, Japan

[21] Appl. No.: 235,441

[22] Filed: Aug. 23, 1988

[30] Foreign Application Priority Data

Aug. 31, 1987 [JP] Japan .......................... 62-131409[U]

[51] Int. Cl.$^5$ .......................... B32B 3/02; B60D 25/06
[52] U.S. Cl. ...................... 428/157; 428/81;
428/121; 428/126; 428/161; 428/162; 428/172;
428/182; 428/192; 428/212; 428/213; 428/214;
428/218; 428/219; 428/252; 428/253; 428/286;
428/287; 428/339; 428/340; 428/479.6;
428/513; 428/537.5; 296/210; 296/214
[58] Field of Search .............. 428/172, 182, 219, 220,
428/253, 287, 513, 913.3, 252, 286, 319.9, , 192,
81, 121, 126, 141, 147, 156, 157, 161, 162, 170,
174, 177, 201, 212, 213, 215, 218, 299, 332, 337,
340, 339, 479.6, 537.5, 214; 181/288, 286, 284,
290–294; 296/210, 211, 213, 214

[56] References Cited

U.S. PATENT DOCUMENTS

| | | | |
|---|---|---|---|
| 4,119,749 | 10/1978 | Roth et al. ........................ | 296/214 |
| 4,119,794 | 10/1978 | Matsuki ........................... | 428/182 |
| 4,131,702 | 12/1978 | Alfter et al. ...................... | 296/214 |
| 4,150,850 | 4/1979 | Doefling ........................... | 428/172 |
| 4,256,797 | 3/1981 | Stamper et al. ................... | 296/214 |
| 4,479,992 | 10/1984 | Häeseker et al. ................. | 296/214 |

FOREIGN PATENT DOCUMENTS 58-53541  3/1983  Japan ................................. 296/214

Primary Examiner—Ellis P. Robinson
Assistant Examiner—Donald J. Loney
Attorney, Agent, or Firm—Foley & Lardner, Schwartz, Jeffery, Schwaab, Mack, Blumenthal & Evans

[57] ABSTRACT

A pressed ceiling for use in vehicles comprising a base material of corrugated cardboard heat-press formed to a predetermined form, a surface skin material heat-pressed to the inner face of the corrugated cardboard base material thus-formed and a layer of heat melting adhesive interposed between the corrugated cardboard base material and the surface skin material, wherein the heat melting adhesive layer is made thicker at the peripheral portions of the press formed corrugated cardboard base material to restrain or prevent the spring-back of the press formed corrugated cardboard base material at its peripheral portions when it has moisture again.

5 Claims, 2 Drawing Sheets

PRESSED CEILING FOR USE IN VEHICLES

BACKGROUND OF THE INVENTION

1. Field of the Invention

The present invention relates to a pressed car ceiling attached to the underside of the roof panel in the car.

2. Prior Art

The pressed car ceiling is attached to the underside of the roof panel in the car to make the inside of the car beautiful, enhance the safety of persons in the car and attain adiabatic and sound insulation effects.

The pressed car ceiling 1 shown in FIG. 1, for example, is formed by press-forming a base material 2 of corrugated cardboard to meet the inner outline of the roof panel 5 according to the hot press method and heat-pressing a surface skin material 3 on the underside of the molded corrugated cardboard base material 2 with a layer 4 of heat melting adhesive interposed between them. The pressed car ceiling 1 thus formed is positioned along the roof panel 5, keeping its corrugated cardboard base material 2 upside, and fixed to a roof rail 7 by welts or garnishes 6 at its peripheral rim.

In the case of the conventional pressed car ceilings, the heat melting adhesive layer 4 is intended only to put the corrugated cardboard base material 4 and the surface skin material 3 together and it is therefore provided thin and uniform between them.

The pressed car ceiling 1 discharges moisture contained in it in the process of press-forming the corrugated cardboard base material 2 and internal stress is caused and remains at its peripheral portion which is more deeply curved inward. When the corrugated cardboard base material has absorbed ambient moisture after the press-forming therefore, this remaining internal stress forces its peripheral portion which has been curved inward to deform outward to return to its original shape. A so-called spring-back occurs. When this spring-back occurs, its peripheral portion is not fitted to the inner outline of the roof, panel 7, as shown by a broken line 1' in FIG. 1, and it cannot be attached to the roof panel 7 accordingly. This spring-back may occur at its other portions which have been more deeply curved inward.

SUMMARY OF THE INVENTION

The present invention is therefore intended to provide a pressed car ceiling comprising a base material of corrugated cardboard heat-press formed to a predetermined form according to the hot press method, a surface skin material heat-pressed against the underside of this heat-press formed corrugated cardboard base material, and a layer of heat melting adhesive interposed between these materials, wherein said heat melting adhesive layer is thicker at those portions of the heat-press formed corrugated cardboard base material which have been more deeply curved inward that at the other portion thereof.

The more deeply curved portions of the pressed ceiling can be typically seen along to its right and left sides and its front and rear sides.

The layer of heat melting adhesive which will be hardened and contracted by cooling after the heat and press forming processes to pull the corrugated cardboard base material inward is made thicker at the peripheral portions of the pressed car ceiling which have been more deeply curved inward than at the center portion thereof. Even when, the corrugated cardboard base material has absorbed ambient moisture after the press-forming to force its peripheral portions to deform outward, therefore, its outward deformation can be restrained or prevented by the inward pulling force of the thicker heat melting adhesive layer.

The object of the present invention is therefore to provide a pressed car ceiling capable of restraining or preventing the corrugated cardboard base material from being deformed when it has absorbed ambient moisture after the press-forming.

This and other objects as well as merits of the present invention will become apparent from the following detailed description with reference to the accompanying drawings.

DETAILED DESCRIPTION OF THE PREFERRED EMBODIMENT

Figure 1:
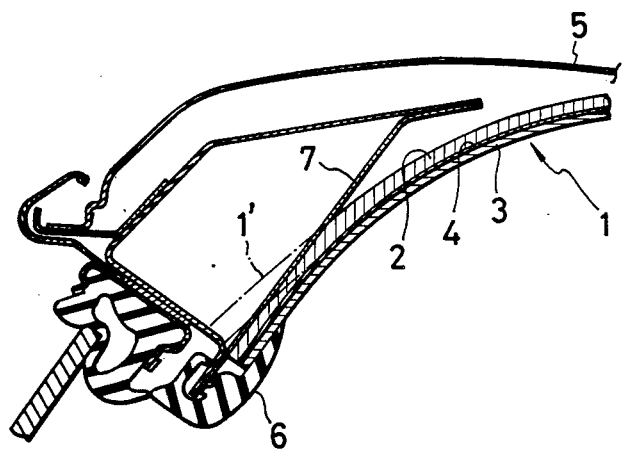
FIG. 1 is a sectional view showing the conventional pressed car ceiling attached to one side of the roof panel in a car.
Figure 2:
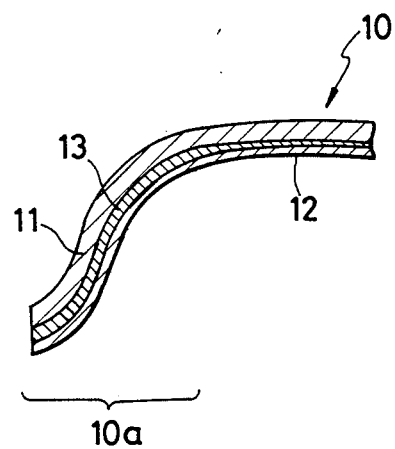
FIG. 2 is a sectional view showing the peripheral portion of a pressed car ceiling according to the present invention.

An example 10 of the pressed car ceiling according to the present invention shown in FIG. 2 is made by press-forming a base material 11 of corrugated cardboard to a predetermined form according to the hot press method, then heat-pressing a surface skin material 12 to the underside of the thus-formed corrugated cardboard base material 11 with a layer 13 of heat melting adhesive interposed between them, and trimming the product at the peripheral rim thereof to the predetermined exact form. The car ceiling 10 thus made is fixed to the roof rail in the car by the welts, garnishes or the like, similarly to the conventional one.

Figure 3:
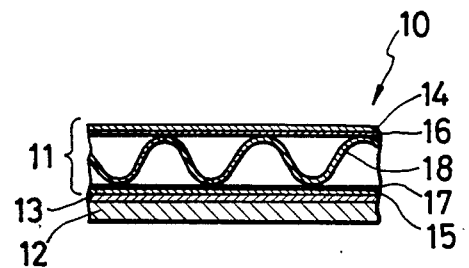
FIG. 3 is sectional view showing a part of the pressed car ceiling enlarged.
Figure 4:
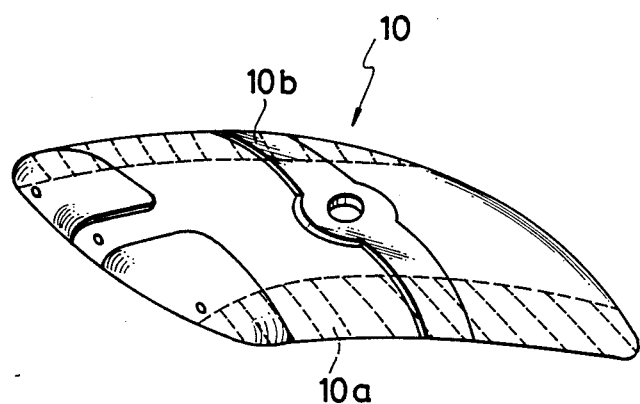
FIG. 4 is a perspective view showing the pressed car ceiling according to the present invention.

The corrugated cardboard base material 11 comprises two upper and lower paper liners 14 and 15 and a corrugated paper core 18 interposed between these upper and lower paper liners 14 and 15 and bonded to them by polyethylene films 16 and 17 which are heat melting adhesive, as shown in FIG. 3. This corrugated cardboard base material 11 is heat-press formed to meet the inner outline of the roof panel to which the pressed car ceiling is to be attached, the surface skin material 12 is heat-pressed to the underside of the thus-formed corrugated cardboard base material with the film-like heat melting adhesive layer 13 interposed between them, and the thus-made product is trimmed at the peripheral rim thereof to form the pressed car ceiling 10 shown in FIG. 4. Nonwoven fabric or tricot made of polyester is used as the surface skin material 12.

The film-like heat melting adhesive layer 13 is made thicker at those front and rear sides 10a and 10b (hatched by broken lines in FIG. 4) of the peripheral portions of the pressed car ceiling 10 which are more deeply curved inward, as shown in FIG. 2. However, it is made thin at the center portion of the pressed car ceiling 10 because this center portion is not so deeply curved inward and not deformed so hard accordingly when the pressed car ceiling 10 has absorbed ambient moisture after the press-forming.

The pressed car ceiling 10 described above is used in the cars of small or medium size. The density of two upper and lower liners 14 and 15 of the corrugated cardboard base material 11 are in the a range of about 280–300 g/m², the thickness of each of the polyethylene films 16 and 17 is in a range of about 25–50 82 m, the density of core 18 is in a range of 200–240 g/m² and polyester nonwoven fabric having a density of about 200–300 g/m² is used as the surface skin material 12.

A film made of resin which belongs to the group of olefin is used as the heat melting adhesive layer 13.

The width of each of those portions along the front and rear sides 10a and 10b of the pressed car ceiling 10 where the heat melting adhesive layer 13 is made thicker is 150 –200 mm in the horizontal direction and the heat melting adhesive layer 13 is here 75–100 82 m thick. It is 30–50 82 m thick at that portion of the pressed car ceiling 10 which does not include the front and rear portions 10a and 10b thereof.

According to the pressed car ceiling 10 made as described above, the pulling force of the thicker heat melting adhesive layer 13 which is hardened and contracted by cooling is larger than the deforming force of the corrugated cardboard base material 11 at the more deeply curved portions 10a and 10b along the front and rear sides of the pressed car ceiling 10 which is caused when it has absorbed moisture after the press-forming process. Therefore, this pulling force prevents the portions 10a and 10b of the pressed car ceiling 10 from being deformed outward. This makes it possible to firmly attach the pressed car ceiling 10 to the roof panel of the car without being influenced by moisture.

The merit of restraining or preventing the corrugated cardboard base material 11 from being deformed at its portions where it is more deeply curved inward depends largely upon the thickness of the heat melting adhesive layer 13 in a sense. Therefore, the outward deformation of the corrugated cardboard base material 11 at its portions which are along its front and rear, sides can be prevented only by making the heat melting adhesive layer 13 thick to some extent.

Although the heat melting adhesive layer 13 has been made thicker at those portions of the corrugated cardboard base material 11 which are along the front and rear sides thereof, it may be similarly made thicker along the right and left sides of the corrugated cardboard base material 11. Its application is not limited to these portions. When it is made thicker at any other portions of the corrugated cardboard base material 11 where it is more deeply inward and thus made likely to be deformed outward, same merit as the above one can be attained.

Although the present invention has been described citing its preferred embodiment, it should be understood that various changes and modifications can be made without departing from the spirit and scope of the present invention.

I claim:

1. In a pressed ceiling for use in vehicles comprising a base material of corrugated cardboard heat-press formed to a predetermined form, a surface skin material heat-pressed to an inner face of the corrugated cardboard base material thus formed, a layer of heat melting adhesive interposed between the corrugated cardboard base material and the surface skin material, and means for preventing outward deformation of the base material at those portions of the base material which are more deeply curved inward, said preventing means including a greater thickness of said heat melting adhesive layer at those portions of the molded corrugated cardboard base material which are more deeply curved inward, wherein:

the more deeply curved portions of the press formed corrugated cardboard base material are along right and left sides thereof;

the corrugated cardboard base material comprises upper and lower paper liners and a corrugated paper core bonded to these upper and lower liners through polyethylene films;

the corrugated paper core has a density of about 200–240 g/m², the polyethylene film has a thickness of about 25–50 82 m, and the paper liners have a density of about 280–300 g/m²;

the area of the pressed ceiling where the heat melting adhesive layer is made thicker is in a range of 150–200 mm when measured inward from the rim of the pressed ceiling horizontal direction;

the heat melting adhesive layer is a resin film of the olefin group; and the resin film of the olefin group is 75–100 $\mu$m thick at the peripheral portions of the press formed corrugated cardboard base material and 30–50 $\mu$m thick at the other portion thereof.

2. A pressed ceiling according to claim 1 wherein the more deeply curved portions of the press formed corrugated cardboard base material are along right, left, front and rear sides thereof.

3. A pressed ceiling according to claim 1 wherein the surface skin material is a sheet of tricot.

4. A pressed ceiling according to claim 1 wherein the surface skin material is a sheet of nonwoven fabric.

5. A pressed ceiling according to claim 4 wherein the nonwoven fabric is made by bonding polyester webs of about 200–300 g/m² through a binder.

* * * * *